United States Patent [19]

Monte

[11] Patent Number: 4,732,428
[45] Date of Patent: Mar. 22, 1988

[54] STREAMLINED WHEEL FOR BICYCLE

[75] Inventor: Antonio D. Monte, Rome, Italy

[73] Assignee: Also Laboratori S.a.s. di Dr. P. Sorbini & C., Milan, Italy

[21] Appl. No.: 688,133

[22] Filed: Jan. 2, 1985

[30] Foreign Application Priority Data

May 4, 1984 [IT] Italy .......................... 21700/84

[51] Int. Cl.⁴ ........................... B60B 3/08; B60B 5/02
[52] U.S. Cl. .......................... 301/63 DD; 301/63 PW
[58] Field of Search ....... 301/63 DD, 63 DT, 63 DS, 301/63 PW

[56] References Cited

U.S. PATENT DOCUMENTS

| 763,145 | 6/1904 | Brennan | 301/63 DD |
| 1,411,665 | 4/1922 | Kirchner | 301/63 DS |
| 1,518,369 | 12/1924 | Stolp | 301/63 DS |

FOREIGN PATENT DOCUMENTS

| 482089 | 4/1952 | Canada | 301/63 DD |
| 880700 | 6/1953 | Fed. Rep. of Germany | 301/63 DD |
| 74931 | 4/1949 | Norway | 301/63 DD |

OTHER PUBLICATIONS

"The Biomechanics for the Preparation of a Record", Le Monde Cycliste, A. Dal Monte, Jan. 1986, p. 38.

Primary Examiner—David A. Scherbel
Attorney, Agent, or Firm—Millen & White

[57] ABSTRACT

The invention relates to a streamlined wheel for bicycle, formed by two half shells hollow inside and with thin section, which are coupled together to form a rim having biconvex lenticular shape with a circumferential groove to house a tire.

5 Claims, 6 Drawing Figures

STREAMLINED WHEEL FOR BICYCLE

FIELD OF THE INVENTION

The present invention relates to a wheel for bicycle and more in detail to a wheel for bicycle showing a shape to endow the wheel itself with higher streamline and functionality of use if compared to the wheels for bicycle used up to now.

As it is known, in the field of bicycle competitions, both on the track and on the road, besides the factor of lightness, also the factor of the bicycle streamline is very important. From among the bicycle components on which it is possible to act in order to improve its streamline penetrations, there are wheels, the spoke configuration of which creates, with the race wind, turbulences negatively affecting the resistance to the forward movement.

One of the possible systems to eliminate the formation of air turbulences is to apply fairings to the wheels. However, the rules regulating cycling competitions forbid the use of any kind of covering on the wheel spokes.

An object of this invention is therefore to provide a bicycle wheel with a streamline configuration and which at the same time complies with the aforementioned regulations.

SUMMARY OF THE INVENTION

Said object is attained by means of a bicycle wheel characterized in that it comprises a couple of circular plan half shells, hollow inside and with thin section, the reciprocal coupling of which creates a rim with biconvex lenticular shape showing a circumferential groove suitable for housing a tire.

Each of two half shells forming the rim presents its external circumferential lip bent so as to form at least part of said housing groove for the tire and consists of an aluminium extrusion or of a half body made of molded plastic material and strengthened for instance with carbon fibers. The coupling of the two half shells can be obtained by sticking or partial superimposition with riveting of the external circumferential edges of said half shells. The lenticular biconvex shape, besides providing the wheel with high streamline eliminating the formation of air turbulences, also endows the same with high rigidity as well as the structural resistance. Furthermore, the two half shells, due to the fact that they are obtained by molding or extrusion, eliminate any problem of wheel centering and allow geometrical balancing on the mold.

The wheel according to the invention, for its characteristic of streamline and lightness is particularly suitable for competition bicycles, but its simplicity and low cost make its use advantageous also in series bicycles.

DESCRIPTION OF THE PREFERRED EMBODIMENTS

Figure 1A:
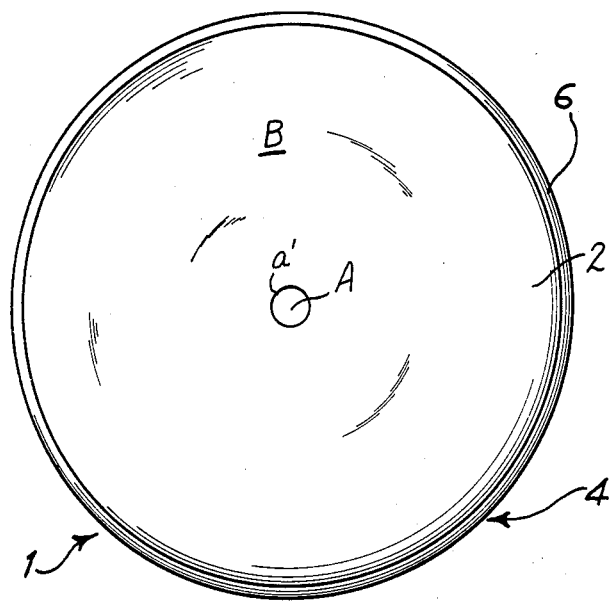
FIG. 1A is a plan view the wheel in accordance with the instant invention.

With reference to the figures, a wheel 1 comprises a couple of half shells 2 having circular plan about an axis A, hollow inside and with thin section, the reciprocal coupling thereof form a rim with biconvex lenticular shape presenting a circumferential groove 3 suitable for housing a tire 4. The two half shells 2 are obtained by extrusion of an aluminium plate or by molding a composite plastic material, strengthened with carbon fibers. Each half shell 2 has the external circumferential edge bent substantially in an L-shape on its concave side so as to form at least part of the groove 3 for housing the tire 4.

Figure 1B:
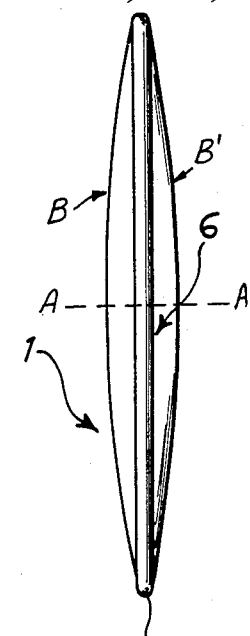
FIG. 1B is a front view of the wheel of FIG. 1A.

Considering FIG. 1, it is possible to notice that the sides 6 of the tire 4 housed in groove 3 fit, almost without continuity solution or substantially, to the convex profile of the half shells forming the rim, improving the wheel streamline.

Figure 2A:
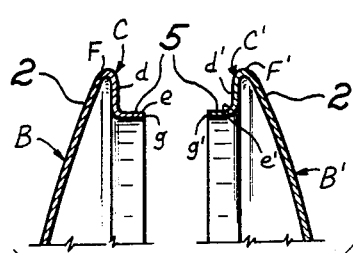
FIG. 2A is a cross sectional view of two half shells to be coupled by sticking or welding before coupling.
Figure 2B:
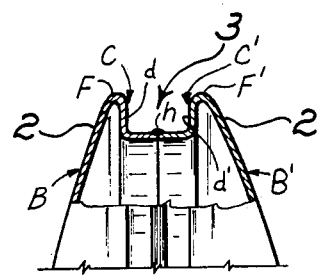
FIG. 2B is a view similar to FIG. 2A but after coupling.
Figure 3A:
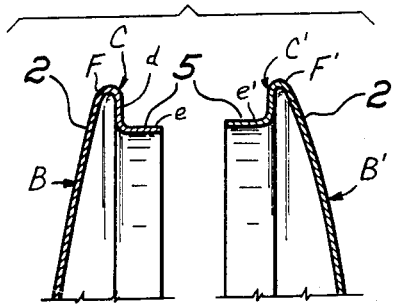
FIG. 3A is a view similar to FIG. 2 of two half shells to be coupled by riveting.
Figure 3B:
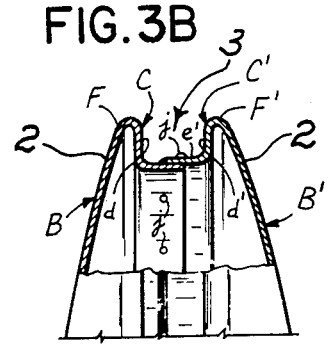
FIG. 3B is a view similar to FIG. 3A but after riveting the half shells.

The coupling of the two half shells 2 can be obtained in different ways and FIGS. 2 and 3 illustrate two embodiments for exemplifying purposes.

In FIG. 2 the two half shells 2 are coupled by sticking or head welding of the edges 5 to adhere the edges together, while in FIG. 3 they are coupled by partial superimposition of the edges 5 and riveting. In the latter case one of the half shells is shaped in a way that its edge 5 presents the internal diameter slightly higher than or even equal to the external diameter of the edge of the corresponding half shell.

Considering the instant invention further and in more detail, the wheel 1 is a streamlined wheel upon which a tire 6 of a bicycle, such as a racing bicycle, is mounted. The wheel 1 comprises first and second half-shells 2 and 2' which when joined together form a hollow wheel. Each of the half-shells 2 and 2' is circular about the axis A and has a thin cross section. The half-shells 2 and 2' each have substantially identical, continously convex outer surfaces, designated generally by the letters B and B', which curve continuously and convexly from an axle hole a' until terminating at rim portions, designed generally by the letters C and C'. As is seen in the figures, the sign of the slope of the convex surfaces B and B' does not change as the surfaces progress from the axle hole a' to the rims C and C'. At the rims C and C', the structure extends inward of the outer convex surfaces B and B'. The rim portions C and C' are formed by radial flanges d and d' which extend inwardly towards the axis A and axial flanges e and e' which extend in a direction substantially parallel to the axis A. The radial flanges d and d' are joined to the surfaces B and B' by curved peripheral portions f and f'. The components of each half shell 2 and 2' are preferably unitary with one another and are formed of one piece.

In order to create the wheel 1, the half shells 2 and 2' and joined by joining the axial flanges e and e' to one another. In the embodiment of FIG. 2, the axial flanges e and e' are abuttment with another at the edges g and g' thereof and are welded as is indicated by the bead h. In the embodiment of FIG. 3, the length of radial flange d' may be less than the length of radial flange d by the thickness of the material forming the half-shell so that the axial flange e' of the half shell 2' slides over the axial flange e of the half shell 2. In accordance with one embodiment of the invention, the axial flanges e and e' are joined by rivets j.

I claim:

1. A streamlined wheel upon which a tire of a bicycle is mounted, the wheel comprising:

first and second half-shells which when joined form a hollow wheel; each half-shell being made of reinforced composite plastic material, being circular about an axis and having a thin cross section; the half-shells each having identical, continuously convex curved outer surfaces terminating in rim portions extending inward of the convex outer surfaces, each rim portion being formed by a radial flange extending radially inwardly toward the axis and joined to the continuously convex outer surface by a peripheral portion and by an axial flange extending in the axial direction from the radial flange; means for joining the axial flanges of the half-shells to one another at a location on each axial flange spaced from the radial flange of the other half-shell to form a groove around the periphery of the wheel for receiving the tire, which tire forms a substantially continuous curve with the continuously convex outer surfaces.

2. The streamlined wheel of claim 1 wherein the radial flange of one half-shell extends radially inward less than the radial flange of the other half-shell by a distance substantially equal to the thickness of the radial flanges and wherein the means for joining th two half-shells includes overlapping the axial flanges to form the groove for the tire.

3. The streamlined wheel of claim 2 wherein the means for joining the axial flanges further includes riveting the overlapped axial flanges to one another.

4. The streamlined wheel of claim 1 wherein the lengths of the radial flanges are identical and the means for joining the axial flanges comprises abuttment of the axial flanges in non-overlapping relationship and adhesion of the axial flanges to one another.

5. The streamlined wheel of claim 4 wherein the adhesion is a weld.

* * * * *